US012701120B2

(12) United States Patent
Alden et al.

(10) Patent No.: US 12,701,120 B2
(45) Date of Patent: Aug. 4, 2026

(54) THIRD-PARTY ACCESS-CONTROL SUPPORT USING ROLE HISTORY ANALYSIS

(71) Applicant: EQUIFAX INC., Atlanta, GA (US)

(72) Inventors: John Alden, Ballwin, MO (US); Janice Johnson, Brichwood, WI (US); Jeffrey Wagner, Chesterfield, MO (US)

(73) Assignee: EQUIFAX INC., Atlanta, GA (US)

( * ) Notice: Subject to any disclaimer, the term of this patent is extended or adjusted under 35 U.S.C. 154(b) by 6 days.

(21) Appl. No.: 18/918,521

(22) Filed: Oct. 17, 2024

(65) Prior Publication Data

US 2025/0119433 A1     Apr. 10, 2025

Related U.S. Application Data

(63) Continuation of application No. 17/753,805, filed as application No. PCT/US2020/053559 on Sep. 30, 2020, now Pat. No. 12,143,390.

(Continued)

(51) Int. Cl.
*H04L 9/40*        (2022.01)
*G06F 9/46*        (2006.01)
(Continued)

(52) U.S. Cl.
CPC .......... *H04L 63/102* (2013.01); *H04L 63/083* (2013.01); *H04L 63/101* (2013.01);
(Continued)

(58) Field of Classification Search
CPC .............................. H04L 41/0631; G06F 9/468
See application file for complete search history.

(56) References Cited

U.S. PATENT DOCUMENTS 10,341,385 B2 *  7/2019  Moloian ................. H04L 63/10
12,143,390 B2    11/2024  Alden et al.
(Continued)

FOREIGN PATENT DOCUMENTS

WO        2019006272 A1      1/2019

OTHER PUBLICATIONS

U.S. Appl. No. 17/753,805 , Non-Final Office Action, Mailed On Feb. 5, 2024, 6 pages.
(Continued)

*Primary Examiner* — Barbara B Anyan
(74) *Attorney, Agent, or Firm* — Kilpatrick Townsend & Stockton LLP

(57)        ABSTRACT

Various aspects of the present disclosure involve computing environments that provide third-party access-control support. For instance, an access-control computing system can access a secure identity repository having role history data from various contributor computing systems. The access-control computing system can compare an identified set of roles with a set of roles described by role history data for a target entity. The access-control computing system can determine, from the comparison, whether the target entity poses a security risk based on inconsistencies between the sets of roles, durations associated with the roles, or both. The access-control computing system can provide a client computing system with a dynamic access-control data structure that is generated based on the comparison. The dynamic access-control data structure allows the client computing system to output the security assessment to an end user or to otherwise facilitate further security measures with respect to the target entity.

20 Claims, 5 Drawing Sheets

Related U.S. Application Data

(60) Provisional application No. 62/907,750, filed on Sep. 30, 2019.

(51) Int. Cl.

| | | |
|---|---|---|
| *G06F 21/62* | (2013.01) |
| *H04L 41/0631* | (2022.01) |

(52) U.S. Cl.

CPC ............ *H04L 63/108* (2013.01); *G06F 9/468* (2013.01); *G06F 21/62* (2013.01); *H04L 41/0631* (2013.01)

(56) References Cited

U.S. PATENT DOCUMENTS

| | | | | |
|---|---|---|---|---|
| 2004/0205039 | A1* | 10/2004 | Bittner | .................... G06F 9/468 706/47 |
| 2007/0234270 | A1* | 10/2007 | Cohen | ..................... H04L 67/34 717/100 |
| 2009/0199264 | A1 | 8/2009 | Lang | |
| 2009/0222914 | A1 | 9/2009 | Ozawa | |
| 2014/0082163 | A1* | 3/2014 | Senga | ................... H04W 84/20 709/220 |
| 2018/0232403 | A1* | 8/2018 | Bhatti | ................... G06F 16/252 |
| 2018/0234416 | A1* | 8/2018 | Moerk | .................... H04L 63/08 |
| 2018/0288060 | A1* | 10/2018 | Jackson | ................ H04L 63/107 |
| 2019/0098012 | A1 | 3/2019 | Dong et al. | |
| 2019/0164173 | A1 | 5/2019 | Liu et al. | |
| 2019/0243979 | A1 | 8/2019 | De Gaetano et al. | |

OTHER PUBLICATIONS

U.S. Appl. No. 17/753,805 , Notice of Allowance, Mailed On Jul. 9, 2024, 9 pages.

Canadian Application No. CA3,151,331 , Office Action, Mailed On Jan. 8, 2024, 5 pages.

International Application No. PCT/US2020/053559 , International Search Report and Written Opinion, Mailed On Jan. 18, 2021, 15 pages.

Canadian Application No. CA3,151,331 , Office Action, Mailed On Apr. 10, 2025, 5 pages.

Australian Application No. AU2020360393, "First Examination Report", Nov. 6, 2025, 4 pages.

Australia Appl. No. 2020360393, Notice of Acceptance, Apr. 20, 2026, 3 pages.

* cited by examiner

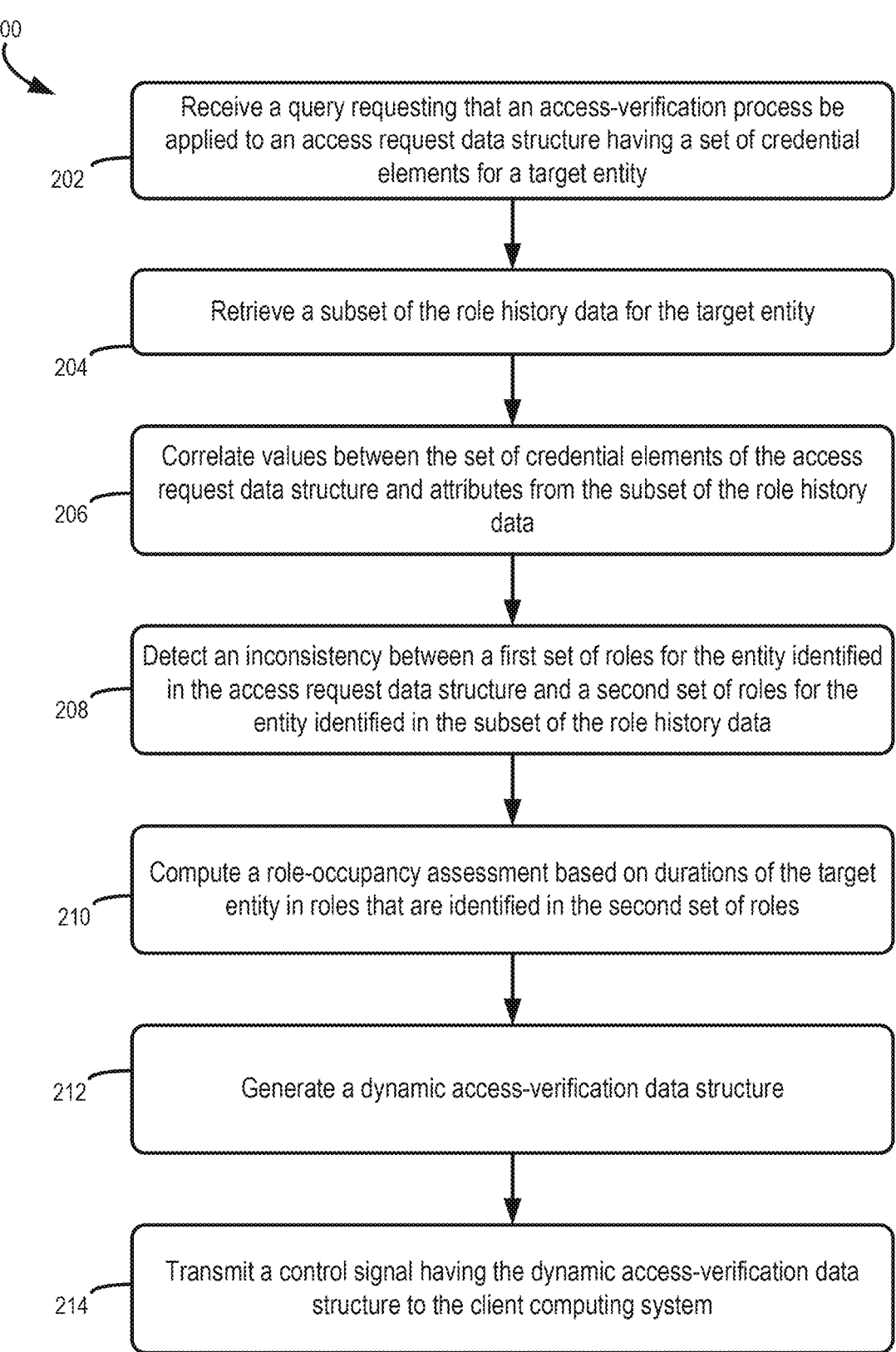

200

202   Receive a query requesting that an access-verification process be applied to an access request data structure having a set of credential elements for a target entity 204   Retrieve a subset of the role history data for the target entity 206   Correlate values between the set of credential elements of the access request data structure and attributes from the subset of the role history data 208   Detect an inconsistency between a first set of roles for the entity identified in the access request data structure and a second set of roles for the entity identified in the subset of the role history data 210   Compute a role-occupancy assessment based on durations of the target entity in roles that are identified in the second set of roles 212   Generate a dynamic access-verification data structure 214   Transmit a control signal having the dynamic access-verification data structure to the client computing system

FIG. 2

THIRD-PARTY ACCESS-CONTROL SUPPORT USING ROLE HISTORY ANALYSIS

CROSS REFERENCE TO RELATED APPLICATIONS

This application is a continuation of U.S. application Ser. No. 17/753,805, filed Mar. 15, 2022, which is a U.S. National Stage of International Application No. PCT/US2020/053559, filed Sep. 30, 2020, which claims priority to U.S. Provisional Application No. 62/907,750 filed on Sep. 30, 2019, the disclosures of which are hereby incorporated by reference in their entireties.

TECHNICAL FIELD

This disclosure relates generally to computer-implemented techniques for protection of data processing systems or other systems, and more particular relates to computing environments that provide third-party access-control support.

BACKGROUND

The protection of machines, computing devices, or other systems or structures involves performing security assessments of entities that seek to gain access or control of these machines, computing devices, or other systems or structures. For instance, security assessments can be used to detect potentially fraudulent attempts at such access. The security assessment can be used to implement access control techniques that restrict or prevent the entities' attempted access.

SUMMARY

Various aspects of the present disclosure involve computing environments that provide third-party access-control support. In one example, an access-control computing system receives, from an external client computing system, an access request data structure identifying a target entity. The access-control computing system can identify, from elements in the access request data structure, a set of roles held by the target entity. The access-control computing system can access a secure identity repository having role history data from various contributor computing systems. The access-control computing system can compare the identified set of roles with a set of roles described by role history data for the target entity. The access-control computing system can determine, from the comparison, whether the target entity poses a security risk based on inconsistencies between the sets of roles, durations associated with the roles, or both. The access-control computing system can provide the client computing system with a dynamic access-control data structure that is generated based on the comparison. The dynamic access-control data structure can allow the client computing system to output the security assessment to an end user or to otherwise facilitate further security measures with respect to the target entity.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim. The foregoing, together with other features and examples, will become more apparent upon referring to the following specification, claims, and accompanying drawings.

BRIEF DESCRIPTION OF THE DRAWINGS

FIG. 2 depicts an example of a process for using an access-control computing system to perform third-party authorization support for client computing systems, according to certain aspects described within the present disclosure.

DETAILED DESCRIPTION

Figure 1:
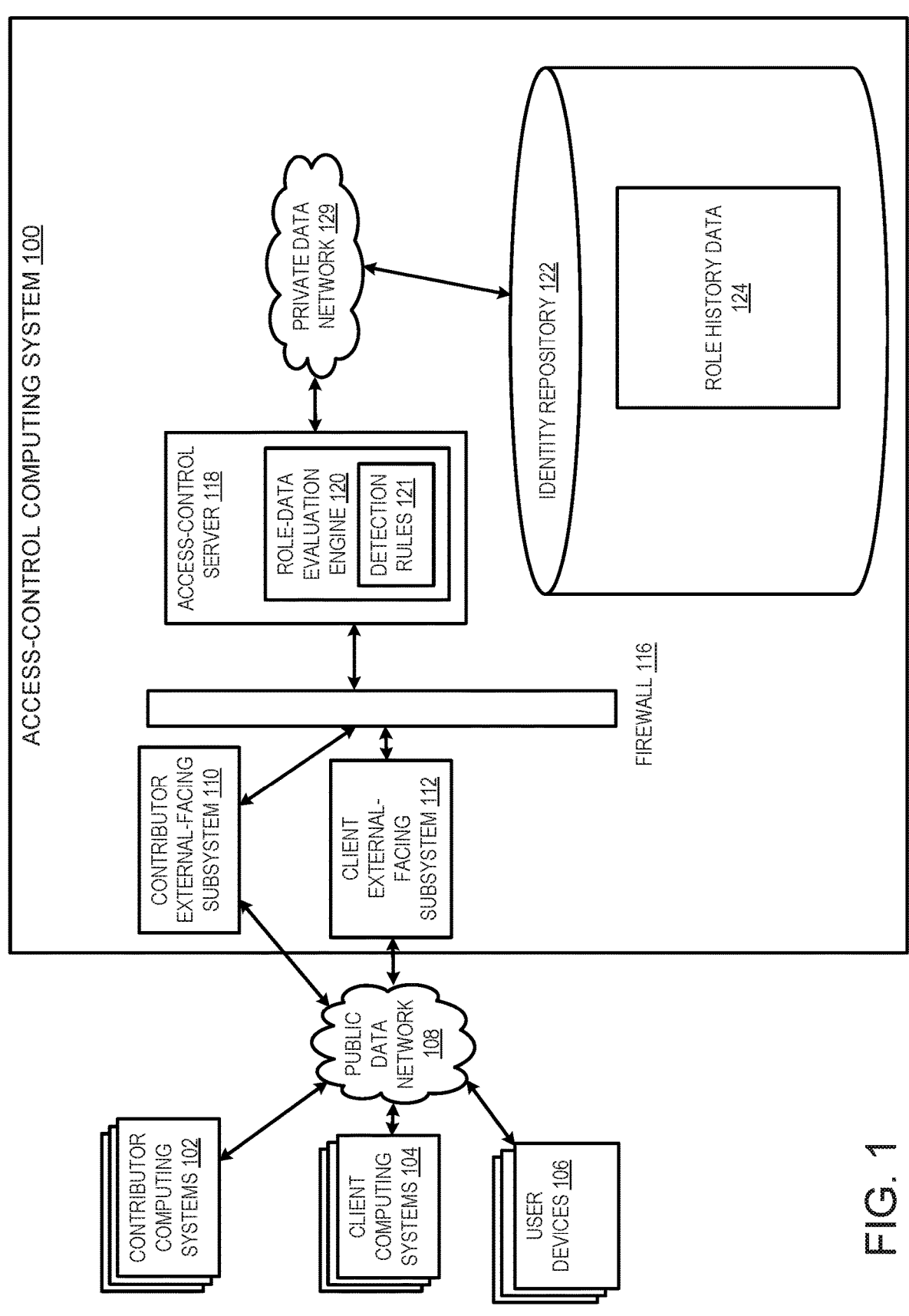
FIG. 1 depicts an example of an operating environment in which an access-control computing system processes queries regarding assessments of role history data for target entities, according to certain aspects described within the present disclosure.

Aspects and examples are disclosed for using computing systems to perform third-party access-control support, which can involve assessing the risk of providing target entities with access to machines, computing devices, facilities, or other systems or structures operated by or associated with a client computing system. For instance, an access-control computing system receives, from an external client computing system, an access request data structure having a set of credential elements for a target entity. The access-control computing system can identify, from the credential elements, a set of roles held by the target entity. The access-control computing system can compare the set of roles identified from the credential element with a set of roles described by role history data for the target entity, where the role history data is maintained in a secure identity repository having data from various contributor computing systems that may be inaccessible to the client computing system. The access-control computing system can determine, from the comparison, whether the target entity poses a risk based on inconsistencies between the sets of roles, durations associated with the roles, or both. The access-control computing system can provide the client computing system with a dynamic access-control data structure that is generated based on the comparison. The dynamic access-control data structure can allow the client computing system to output the risk to an end user or to otherwise facilitate further risk assessment measures with respect to the target entity.

In some aspects, the access-control computing systems described herein can protect computing environments or other systems or facilities more effectively than existing computing systems. For instance, datasets that describe entities and that are used to perform security assessments could include incomplete, inaccurate, or falsified data. Existing systems for performing security assessments may provide access to such datasets, but rely on subjective, manual efforts to detecting inconsistencies indicative of efforts to access systems or facilities without proper authorization. Certain aspects of the access-control computing systems described herein can address these deficiencies by detecting and flagging such inconsistencies For example, an access-control computing system can include an identity repository to securely store role history data obtained from a large number of different contributor computing systems. The access-control computing system can apply one or more particular rules for detecting, in an automated manner, inconsistencies between role data identified in an access request data structure and role history data accessible from the secure identity repository. Applying these rules to detect inconsistencies allows the access-control computing system to generate and provide a dynamic access-control data structure that is usable, by a client computing system, for assessing security issues associated with a target entity and restricting or preventing the target entity's access to certain functions, operating environments, facilities, or other access-controlled systems. Thus, aspects described herein thereby allow for the automation of certain access-control techniques that facilitate improved security measures as compared to existing systems.

In some aspects, the access-control computing system can provide a single point-of-interface for different clients' systems that provide online services having sensitive data (e.g., online financial services, across different business entities within a banking system as a whole, etc.). The access-control computing system's role as a common point-of-interface to an online tool for performing security assessment operations facilitates rapid identification of potentially fraudulent behavior. For instance, the access-control computing system can securely aggregate account and transaction data from multiple contributor systems, generate accurate indicators of potentially fraudulent attempts to access systems or facilities, and provide warnings to client computing systems. Providing this secure point-of-interface facilitates regular updates to the account and transaction data from multiple contributor systems, and can thereby provide access to accurate warnings of inconsistencies or other fraud indicators using data from multiple consumer and accounts identified in the data from the contributor systems.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Operating Environment Example for Access-Control System

Referring now to the drawings, FIG. 1 is a block diagram depicting an example of an operating environment in which an access-control computing system 100 processes queries regarding assessments of role history data for target entities. In some aspects, assessments of role history data can include detecting discrepancies between role history data for a target entity that is available to client computing systems and role history data obtained from one or more contributor computing systems, performing security assessments based on analyses of frequent changes in roles by a target entity, or some combination thereof.

The access-control computing system 100 is a specialized computing system that may be used for processing large amounts of data using a large number of computer processing cycles. The access-control computing system 100 can communicate with various other computing systems, such as contributor computing systems 102 and client computing systems 104. For example, contributor computing systems 102 and client computing systems 104 may send data to the access-control server 118 to be processed, or may send signals to the access-control server 118 that control or otherwise influence different aspects of the access-control computing system 100 or the data it is processing. The client computing systems 104 may also interact with user devices 106 via one or more public data networks 108.

In some aspects, communications between a client computing system 104 and a user device 106 can facilitate electronic transactions between a user of the user device 106 and an online service provided by the client computing system 104. For instance, an individual can use a user device 106, such as a laptop or other end-user device, to access an online service hosted by a client computing system 104. An electronic transaction between the user device 106 and the client computing system 104 can include, for example, the user device 106 being used to submit an online employment application or other digital application to the client computing system 104 via the online service.

The contributor computing systems 102 and client computing systems 104 may interact, via one or more public data networks 108, with various external-facing subsystems of the access-control computing system 100. The access-control computing system 100 can also include a contributor external-facing subsystem 110 and a client external-facing subsystem 112. Each external-facing subsystem includes one or more computing devices that provide a physical or logical subnetwork (sometimes referred to as a "demilitarized zone" or a "perimeter network") that expose certain online functions of the access-control computing system 100 to an untrusted network, such as the Internet or another public data network 108. In some aspects, these external-facing subsystems can be implemented as edge nodes, which provide an interface between the public data network 108 and a cluster computing system, such as a Hadoop cluster used by the access-control computing system 100.

Each external-facing subsystem is communicatively coupled, via a firewall device 116, to one or more computing devices forming a private data network 129. The firewall device 116, which can include one or more devices, creates a secured part of the access-control computing system 100 that includes various devices in communication via the private data network 129. In some aspects, by using the private data network 129, the access-control computing system 100 can house an identity repository 122 in an isolated network (i.e., the private data network 129) that has no direct accessibility via the Internet or another public data network 108.

Each contributor computing system 102 may include one or more third-party devices (e.g., computing devices or groups of computing devices), such as individual servers or groups of servers operating in a distributed manner. A contributor computing system 102 can include any computing device or group of computing devices used by an operator. The contributor computing system 102 can include one or more server devices. The one or more server devices can include or can otherwise access one or more non-transitory computer-readable media. In some aspects, the contributor computing system 102 can also execute an online service. The online service can include executable instructions stored in one or more non-transitory computer-readable media. The contributor computing system 102 can further include one or more processing devices that are capable of storing, formatting, and transmitting income data, employment data, or both to an access-control computing system 100.

Each client computing system 104 may include one or more third-party devices, such as individual servers or groups of servers operating in a distributed manner. A client computing system 104 can include any computing device or group of computing devices used by an operator. The client computing system 104 can include one or more server devices. The one or more server devices can include or can otherwise access one or more non-transitory computer-readable media. The client computing system 104 can also execute an online service. The online service can include executable instructions stored in one or more non-transitory computer-readable media. The client computing system 104 can further include one or more processing devices that are capable of executing the online service to perform operations described herein.

A contributor computing system 102, a client computing system 104, or both can be operated by any suitable entity. Examples of entities that may operate one or more of these systems include an employer, a payroll system, a human-resource management system, an online merchant, an e-commerce system, an insurance provider system, a health-care provider system, a government data-provider system, etc.

In some aspects, an online service can provide an interactive computing environment accessible to user devices 106 to facilitate electronic transactions involving a user of a user device 106. Examples of the interactive computing environment include a mobile application specific to a particular client computing system 104, a web-based application accessible via mobile device, etc. In some aspects, the executable instructions for the interactive computing environment can include instructions that provide one or more graphical interfaces. The graphical interfaces are used by a user device 106 to access various functions of the interactive computing environment. For instance, the interactive computing environment may transmit data to and receive data from a user device 106 to shift between different states of interactive computing environment, where the different states allow one or more electronic transactions between the user device 106 and the client computing system 104 to be performed. The online service may transmit data to and receive data from the user device 106 to enable a transaction.

A user device 106 can include any computing device or other communication device operated by a consumer, a buyer, or other user. The user device 106 can include one or more user devices 106. A user device 106 can include executable instructions stored in one or more non-transitory computer-readable media. The user device 106 can also include one or more processing devices that are capable of executing the user device 106 to perform operations described herein. In some aspects, the user device 106 can allow a user to engage in an electronic transaction that is used to assess whether a user should be granted access to one or more devices, machines, facilities, computing environments, or other systems or structures that are operated by or otherwise associated with a client computing system 104. An example of such an electronic transaction is a transmission of an access request data structure having a set of credential elements for a target entity.

For instance, the user or other entity accessing the user device 106 can use the user device 106 to engage in an electronic transaction with a client computing system 104 via an interactive computing environment provided by an online service. An electronic transaction between the user device 106 and the client computing system 104 can include, for example, the user device 106 being used to query a set of sensitive or other controlled data, submit an employment application to the client computing system 104 via the interactive computing environment, operating an electronic tool within an interactive computing environment hosted by the client computing system (e.g., a content-modification feature, an application-processing feature, etc.). The access request data structure having a set of credential elements for a target entity can be used, in an access-verification process, to perform a security assessment regarding a user of the user device 106 with access to engage in or complete one or more of these electronic transactions.

In some aspects, the access request data structure can include one or more structured data elements. For instance, the access request data structure could be a database with records having different fields with credential elements, a table having columns or rows with credential elements, an electronic document with metadata identifying names of input fields that include the credential elements, etc. Examples of credential elements include an identifier of a target entity (e.g., a name, a social security number, a geographic address, etc.), a set of one or more organization in which the target entity has held a role (e.g., different employers), a set of one or more names of roles held by the target entity has held a role (e.g., job titles), a set of one or more time elements identifying durations of the target entity in one or more roles (e.g., start dates, end dates, etc.). In additional or alternative aspects, the access request data structure could include unstructured data. For example, the access request data structure could include an image file depicting a scanned copy of an employment application form.

In some aspects, an interactive computing environment implemented through a client computing system 104 can be used to provide access to various online functions. As a simplified example, a website or other interactive computing environment provided by an employer can include electronic functions for requesting access to an environment controlled by the employer, where these functions include submitting an employment application or other access request data structure. A user device 106 can be used to request access to the interactive computing environment or other system provided by or associated with a client computing system 104 used by the employer. Based on the request, the client computing system 104 can collect data associated with the customer and communicate with the access-control server 118 for to perform an access-verification process, which can involve detecting inconsistencies between role data from an identity repository 122 and the employment application or other access request data structure. Based on the access-control results generated by the access-control server 118, the client computing system 104 can determine whether to grant, delay or deny access to a user of the user device 106, thereby granting or denying access with respect to an interactive computing environment or other system that is provided by (or otherwise associated) with the client computing system 104 used by the employer.

Each communication within the access-control computing system 100 may occur over one or more data networks, such as a public data network 108, a private data network 129, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

A data network may include network computers, sensors, databases, or other devices that may transmit or otherwise provide data to the access-control computing system 100. For example, a data network may include local area network devices, such as routers, hubs, switches, or other computer networking devices. The data networks depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security ("TLS"). In addition, data or transactional details communicated among the various computing devices may be encrypted. For example, data may be encrypted in transit and at rest.

The access-control computing system 100 can include one or more access-control servers 118. The access-control server 118 may be a specialized computer or other machine that processes the data received within the access-control computing system 100. The access-control server 118 may include one or more other systems. For example, the access-control server 118 may include a database system for accessing the network-attached storage unit, a communications grid, or both. A communications grid may be a grid-based computing system for processing large amounts of data.

In some aspects, the access-control server 118 can use data obtained from contributor computing systems 102 to facilitate the real-time provision of access-control information, such as indicators that a target entity poses an unacceptable risk of compromise with respect to an interactive computing environment or other system that is provided by (or otherwise associated) with the client computing system 104 used by the employer. In some aspects, this provision of information facilitates real-time detection of potential risks associated with a user device 106 or a user of the user device 106.

The access-control server 118 can include one or more processing devices that execute program code, such as a role-data evaluation engine 120. The program code is stored on a non-transitory computer-readable medium. The access-control computing system 100 can communicate with the client computing systems 104 in a manner that is out of band with respect to the contributor computing systems 102, the user devices 106, or both. For example, the communications between the access-control computing system 100 and a contributor computing system 102 can be performed via a separate communication channel, session, or both as compared to the communication channel or session established between the access-control computing system 100 and a client computing system 104.

The role-data evaluation engine 120 can execute one or more processes for applying rule-based data analytics that identify a potential synthetic identity being used in a target transaction. The role-data evaluation engine 120 retrieves an electronic history, such as a credit file or other employment history described by role history data 124, using query parameters in a query received from the client computing system 104. Examples of these query parameters include one or more of a target entity's name, date of birth, social security number, address, phone number, etc. The role-data evaluation engine 120 can correlate values between a set of credential elements from an access request data structure and attributes from a set of the role history data 124 that is returned in response to the query. A credential element can include values for one or more attributes that, alone or in combination, describe a role held by a target entity. Examples of these attributes include a role title, an identifier of an organization having the role, a start date for the role at the organization, an end date for the role at the organization, etc. The role-data evaluation engine 120 applies one or more detection rules 121 to the computed attribute values. If the applied detection rules 121 result in an output indicating that the target entity may pose a risk with respect to a system operated by or associated with a client computing system 104. Examples of such outputs are described herein with respect to FIGS. 2-4.

In some aspects, the role-data evaluation engine 120 can include one or more modules, such as a web server module, a web services module, or an enterprise services module, which individually or in combination facilitate electronic transactions. For example, a web server module can be executed by a suitable processing device to provide one or more web pages or other interfaces to a contributor computing system 102, a client computing system 104, or a user device 106. The web pages or other interfaces can include content provided by the web services module. The web services module can generate this content by executing one or more algorithms using information retrieved from one or more of the role history data 124. The enterprise services module can be executed to retrieve the information from one or more of the role history data 124.

The access-control computing system 100 may also include one or more network-attached storage units on which various repositories, databases, or other data structures are stored. Examples of these data structures are the identity repository 122. Network-attached storage units may store a variety of different types of data organized in a variety of different ways and from a variety of different sources. For example, the network-attached storage unit may include storage other than the primary storage located within access-control server 118 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The identity repository 122 can store role history data 124. The role history data 124 can be received by the access-control server 118 from contributor computing systems 102, generated by the access-control server 118 based on communications with contributor computing systems 102, or some combination thereof. The role history data 124 can be stored in, for example, a database or other suitable data source. Suitable data sources can include, for example, xx' and credentialed databases or other data structures managed by or otherwise accessible by the role-data evaluation engine 120.

The role history data 124 can include, for example, employment data or other data that describes or identifies certain roles (e.g., employment positions) that have been held by a target entity. The role history data 124 can include any information that can be used to uniquely identify an individual or other entity. In some aspects, role history data 124 can include information that can be used on its own to identify an individual or entity. Non-limiting examples of such role history data 124 include one or more of a legal name, a company name, a social insurance number, a credit card number, a date of birth, an e-mail address, etc. In other aspects, role history data 124 can include information that can be used in combination with other information to identify an individual or entity. Non-limiting examples of such role history data 124 include a street address or other geographical location, employment data, etc.

The identity repository 122 can store any type of account data, transaction data, or both. The identity repository 122 can include internal databases or other data sources that are stored at or otherwise accessible via a private data network (e.g., a network behind the firewall 116) on which the access-control server 118 and the identity repository 122 are located. Non-limiting examples of data stored in identity repository 122 include employment data such as THE WORK NUMBER® data on employment status of consumers, income data, tax data, asset data (e.g., property records or verified data regarding other assets possessed by a client), and other types of target entity information.

The client external-facing subsystem 112 controls access to the identity repository 122 by a client computing system 104. For instance, the client external-facing subsystem 112 services specific queries by a client computing system 104, such as a query requesting that an access-verification process be applied to an access request data structure. The query can be received via a suitable interface, online service, application programming interface, or other structured computing environment provided by or utilized by the client external-facing subsystem 112. In this manner, the client external-facing subsystem 112 prevents the client computing system 104 from accessing data from the identity repository 122 outside the scope of the query (e.g., sensitive data that does not pertain to a target entity specified in the query).

Conventional access control techniques may be vulnerable to circumvention because, for example, a computing system used to perform these techniques lacks the interfaces to the various contributors systems that provide role history data. The disclosure provided herein improves upon the ability of a client computing system to prevent unauthorized intrusions into a computing environment, a facility or other structure, or other resource by providing the client computing system access to an external system that is better positioned to perform security assessments based on the role history data.

For instance, the improvement involves providing an access-control computing system 100 that is external to the client computing system 104. The access-control computing system 100 being external to the client computing system 104 involves the access control server 118 having interfaces to contributor computing system 102 and access to the identity repository 122. In addition, the access-control computing system 100 also involves an access-verification process that occurs external to one or more communication sessions between a client computing system 104 and a user device 106. This further increases the security and accuracy of the access-verification process because the access-verification process is performed without either the consumer computing device or the client device being able to access the data or functions used in the access-verification process. Based on the access-verification process, the access-control computing system 100 can create warnings that are provided to client computing systems. The warnings can be utilized to delay or deny the transactions involving the entities for which access-verification processes are requested, and/or to control access, by the target entities, to interactive computing environments, facilities, or other resources.

In some aspects, the access-control computing system 100 can implement one or more procedures to secure communications between the access-control computing system 100 and other client computing systems. Non-limiting examples of features provided to protect data and transmissions between the access-control computing system 100 and other client computing systems include secure web pages, encryption, firewall protection, network behavior analysis, intrusion detection, etc. In some aspects, transmissions with client computing systems can be encrypted using public key cryptography algorithms using a minimum key size of 128 bits. In additional or alternative aspects, website pages or other data can be delivered through HTTPS, secure file-transfer protocol ("SFTP"), or other secure server communications protocols. In additional or alternative aspects, electronic communications can be transmitted using Secure Sockets Layer ("SSL") technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

As described above, FIG. 1 depicts examples of hardware components of an access-control computing system 100. The numbers of devices depicted in FIG. 1 are provided for illustrative purposes. Different numbers of devices may be used. For example, while certain devices or systems are shown as single devices in FIG. 1, multiple devices may instead be used to implement these devices or systems.

Examples of Access-Control Operations

FIG. 2 is a flow chart illustrating an example of a process 200 for using the access-control computing system 100 to perform third-party authorization support for client computing systems 104. For illustrative purposes, the process 200 is described with reference to implementations described above with respect to FIG. 1. Other implementations, however, are possible. In some aspects, the steps in FIG. 2 may be implemented in program code that is executed by one or more computing devices, such as the access-control computing system 100 depicted in FIG. 1. In some aspects, one or more operations shown in FIG. 2 may be omitted or performed in a different order. Similarly, additional operations not shown in FIG. 2 may be performed.

The process 200 involves receiving, from a client computing system, a query requesting that an access-verification process be applied to an access request data structure having a set of credential elements for a target entity, as depicted at block 202. For example, the client computing system 104 can establish a communication channel with the access-control computing system 100, or vice versa. The access-control computing system 100 can receive, via the communication channel, an access request data structure having a set of credential elements. Each credential element can include data regarding one or more roles occupied by the target entity. In some aspects, the access request data structure can be associated with a user device 106 that conducts a transaction with a client computing system 104 via an interactive computing environment or that otherwise communicates with a client computing system 104 via an interactive computing environment.

The access-control computing system 100 can perform one or more operations for receiving the access request data structure. For example, the access-control computing system 100 can open a server port or transmit a query to the client computing system 104. The client computing system 104 can responsively transmit an access request data structure to the access-control computing system 100 via the data network 108. In some aspects, the client computing system 104 can "push" (i.e., transmit data without specifically receiving a request for the data) the access request data structure to the access-control computing system 100.

In some aspects, the access-control computing system 100 can obtain the access request data structure by generating a suitable call to an application programming interface ("API") of a client computing system 104. Doing so can involve identifying a function call from a particular application programming interface used by the client computing system 104. The access-control computing system 100 can identify data parameters used in the function call (e.g., an identifier for a particular job or other role, an identifier for a particular target entity, etc.) and a data source parameter used in the function call (e.g., a particular "job applicant" database accessible via the client computing system 104). The access-control computing system 100 can generate a function call instance having data parameter values usable that identify a target entity and a data source parameter value specifying a particular data source hosted by the client computing system 104. The access-control computing system 100 can transmit the function call to the client computing system 104 and receive a response from the client computing system 104 is formatted according to the particular API used by the client computing system 104.

The process 200 also involves retrieving, from the identity repository, a subset of the role history data for the target entity, as depicted at block 204. The access-control computing system 100 can perform one or more operations for obtaining role history data for the target entity. For instance, the access-control computing system 100 can extract at least one identifier from the access request data structure. The access-control computing system 100 can query the identity repository with the identifier and receive, responsive to the query, a set of entity records having the identifier. The entity records can include a subset of the role history for the target entity.

The process 200 also involves performing an access-verification process, which can include one or more of blocks 206-210. For instance, block 206 involves correlating values between the set of credential elements of the access request data structure and attributes from the subset of the role history data. The access-control computing system 100 can perform one or more operations for implementing block 206. For instance, the role-data evaluation engine 120 can extract the set of credential elements from the access request data structure.

In some aspects, extracting the set of credential elements from the access request data structure involves obtaining data from fields in an access request data structure that includes structured data. For instance, the access request data structure could be a database with records having different fields with credential elements, a table having columns or rows with credential elements, an electronic document with metadata identifying names of input fields that include the credential elements, etc.

In additional or alternative aspects, extracting the set of credential elements from the access request data structure involves performing one or more data-processing operations on an access request data structure that includes unstructured data. For instance, the access request data structure could include an image file depicting a scanned copy of an employment application form. In this example, data-processing operations performed on the access request data structure could include one or more optical character recognition operations that identify text, segmentation operations that characterize certain text as a field name and other text as a field value, or both.

The process 200 also involves detecting, based on the correlation, an inconsistency between a first set of roles for the entity identified in the access request data structure and a second set of roles for the entity identified in the subset of the role history data, as depicted at block 208. The access-control computing system 100 can perform one or more operations for implementing block 208. For instance, the role-data evaluation engine 120 can compare roles identified by credential elements with roles included in the retrieved subset of role history data. Examples of credential elements include an identifier of a target entity (e.g., a name, a social security number, a geographic address, etc.), a set of one or more organization in which the target entity has held a role (e.g., different employers), a set of one or more names of roles held by the target entity has held a role (e.g., job titles), a set of one or more time elements identifying durations of the target entity in one or more roles (e.g., start dates, end dates, etc.). In block 208, a first set of roles can include, for example, a set job titles with certain employers that the access request data structure identifies as being held by the target entity during certain time periods. A second set of roles can include, for example, a set job titles with certain employers that included in a subset of the role history data 124 that matches the identifier of the target entity. Examples of discrepancies include, for example, differences in role identifications (e.g., job titles) between the first and second set of roles for certain organizations, differences in role durations between the first and second set of roles, the presence of data regarding a role (e.g., all of a particular employer, job title, start date, and end data) in one set of roles and the absence of any data regarding a role (e.g., all of a particular employer, job title, start date, and end data) in the other set of roles (e.g., a job being listed in an employment application while being absent from target entity's data in the identity repository 122, a job being included in the target entity's data in the identity repository 122 while being absent an employment application, or some combination thereof).

The process 200 also involves computing a role-occupancy assessment based on durations of the target entity in roles that are identified in the second set of roles, as depicted at block 210. The access-control computing system 100 can perform one or more operations for implementing block 210. For instance, the role-data evaluation engine 120 can determine for each role held by the target entity, a respective length of a time period that the target entity held the role. To do so, the role-data evaluation engine 120 can identify start dates, end dates, or other indications of the durations with which the target entity held different roles. The role-data evaluation engine 120 can obtain start dates, end dates, or other indications of the durations from the role history data 124, the access request data structure, or some combination thereof. The role-data evaluation engine 120 can compare each duration to a threshold duration identified in one or more detection rules 121. The role-data evaluation engine 120 can use the comparison to generate a role-occupancy assessment. For instance, if a role duration exceeds a threshold duration, the role-data evaluation engine 120 can determine that the role duration does not indicate a risk posed by the target entity. But if a role duration is less than a threshold duration, the role-data evaluation engine 120 can determine that the role duration indicates a risk posed by the target entity.

In some aspects, different threshold durations can be used for different types of roles. For instance, a detection rule 121 can specify that roles indicating a higher level of authority (e.g., managerial roles) have a higher threshold duration as compared to roles indicating a lower level of authority (e.g., associate-level roles). In additional or alternative aspects, certain roles identified for a target entity can be excluded from the role-occupancy assessment. For instance, if the role-data evaluation engine 120 determines that the age of a role (e.g., the start date, the end date, or both) exceeds an age threshold (e.g., more than seven years prior to the performance of access-verification process), the role-data evaluation engine 120 can exclude the role from the process in block 210 or can determine that the role duration does not indicate a risk posed by the target entity. Such an age threshold can be specified in one or more detection rules 121.

The process 200 also involves generating a dynamic access-control data structure that includes the role-occupancy assessment and inconsistency data describing the inconsistency, as depicted at block 212. The access-control computing system 100 can perform one or more operations for implementing block 212. For example, the role-data evaluation engine 120 can generate a dynamic access-control data structure that includes a data structure storing a set of elements that are usable to generate an interface that intuitively explains a risk associated with a target entity. In some aspects, the data structure can include one or more identifiers of the access request data structure (e.g., an application number, an identifier of the target entity, etc.) as an index for the set of elements. The identifier from the access request data structure can be used by the client computing system 104 to match a response received from the access-control computing system 100 to a particular request for an access-verification process.

The inconsistency data in the dynamic access-control data structure can include one or more fields identifying inconsistency identified at block 208. For instance, a dynamic access-control data structure can include, for each role, one or more fields identifying the role (e.g., via the role name, the role duration, etc.) and a flag indicating whether an inconsistency was identified. In one example, a first possible value of the flag could indicate that a particular role was absent from the target entity's role history data in the identity repository 122, a second possible value of the flag could indicate that a particular role was absent from the target entity's access request data structure, and a third possible value could indicate that the particular role was included in both the target entity's role history data in the identity repository 122 the target entity's access request data structure. Additionally or alternatively, a first possible value of the flag could indicate that a role duration from the target entity's role history data in the identity repository 122 is different from a role duration from the target entity's access request data structure, and a second possible value could indicate that a role duration from the target entity's role history data in the identity repository 122 matched a role duration from the target entity's access request data structure.

The dynamic access-control data structure can include one or more fields including results of one or more role-occupancy assessments performed at block 210. For instance, a dynamic access-control data structure can include, for each role, one or more fields identifying the role (e.g., via the role name, the role duration, etc.) and a flag indicating whether a result of a role-occupancy assessment. In one example, a first possible value of the flag could indicate that a role duration for a particular role is associated with a risk posed by the target entity, and a second possible value of the flag could indicate that a role duration for a particular role is not associated with a risk posed by the target entity. For instance, the flag value could indicate a target entity held a job for less than 60 days, which might be indicative of risk. Additionally or alternatively, the dynamic access-control data structure can include the results of one or more role-occupancy assessments that are generated based on a combination of role durations. For instance, if the role-data evaluation engine 120 determines, at block 210, that a target entity held three or more jobs for less than 60 days each, the dynamic access-control data structure can include a security assessment, such as a risk warning. The security assessment can indicate an overall risk associated with the target entity and, in some cases, identify the specific roles that resulted in the security assessment being generated (e.g., the specific roles held by the target entity for less than 60 days).

The process 200 also involves transmitting a control signal having the dynamic access-control data structure to the client computing system, as depicted at block 214. The access-control computing system 100 can perform one or more operations for implementing block 214. For instance, the access-control computing system 100 can configure a network interface device to transmit a suitable electronic communication (e.g., an Extensive Markup Language ("XML") document, a web page, an e-mail, etc.) to a client computing system 104 that executes an interactive computing environment. The electronic communication can include the control signal. The control signal can include, for instance, instructions or data that cause one or more devices of the client computing system to present an interface depicting the results of the access-verification process. The interface can, for example, depict the role-occupancy assessment along with (or represented by) one or more visual indicators of a security assessment (e.g., a risk level) associated with the durations of the target entity in the roles. Additionally or alternatively, the interface can include a timeline view that visually depicts the inconsistency data.

Figure 3:
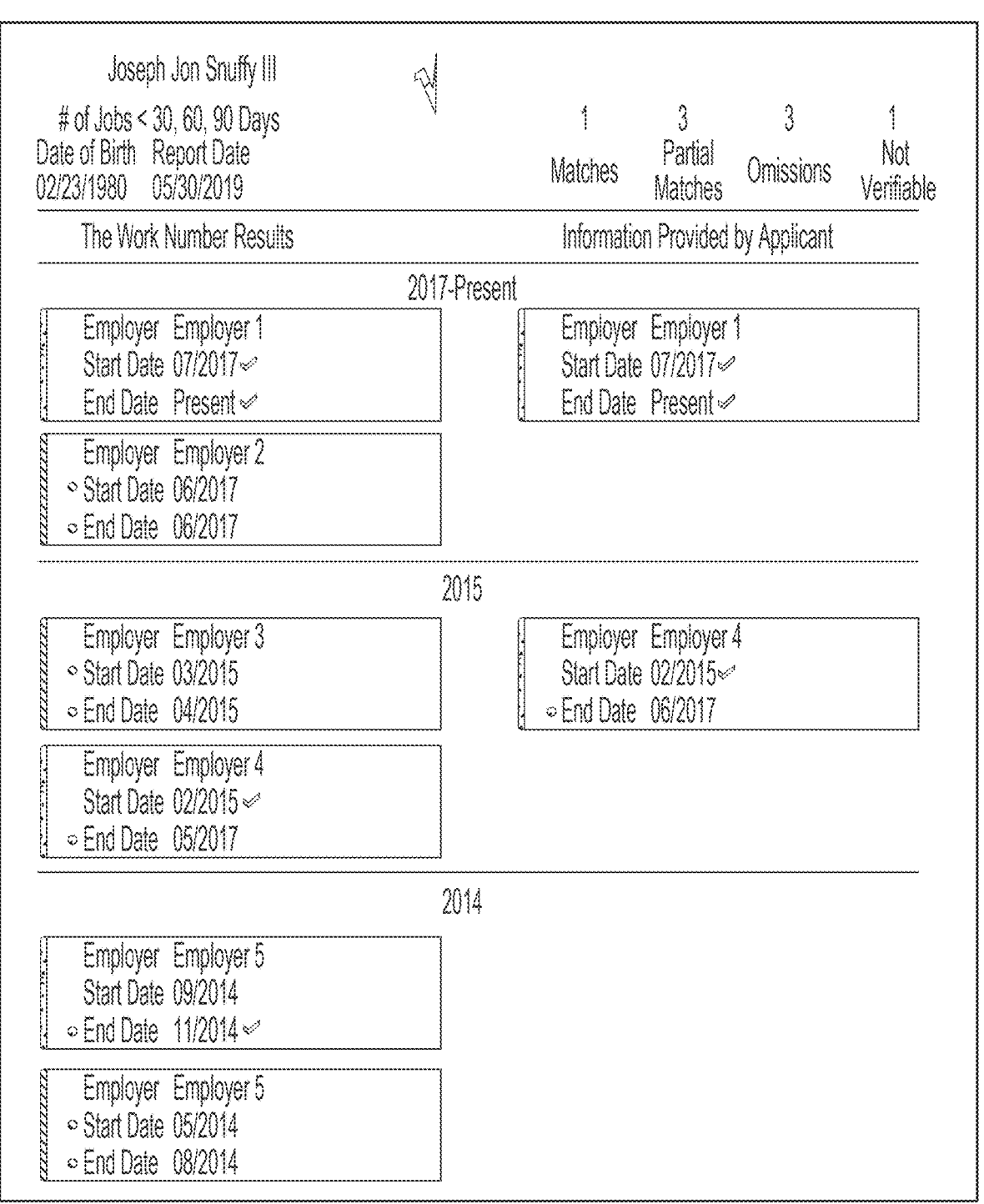
FIG. 3 depicts an example of an interface that can be generated using a dynamic access-control data structure generated by the process in FIG. 2, according to certain aspects described within the present disclosure.

FIG. 3 depicts one example of an interface that can be generated using a dynamic access-control data structure. For instance, the interface depicted in FIG. 3 can include an intelligent summary at the top of the page. In this example, the intelligent summary includes a visual indicator of a risk (e.g., a checkmark having a red color indicating high risk, a yellow color indicating moderate or low risk, or a green color indicating a low or non-existent risk). The intelligent summary can also include a summary of any inconsistencies detected at block 208 of the process 200. In this example, the summary of any inconsistencies indicates matches in job history data, where matches are based on matching start and end dates. The summary can include a number of matches (e.g., matching start and end dates), a number of partial matches (e.g., a match between start dates only, a match between end dates only, matches in the months of start or end dates coupled with discrepancies in days or years of the start or end dates, etc.), a number of omissions (e.g., a role being absent from the access request data structure or the role history data), and a number of unverifiable role identifications.

The intelligent summary can also include a summary of one or more role-occupancy assessments performed at block 210 of the process 200. For instance, in FIG. 3, the interface identifies a number of jobs held by the target entity for less than 30, 60, or 90 days.

Figure 4:
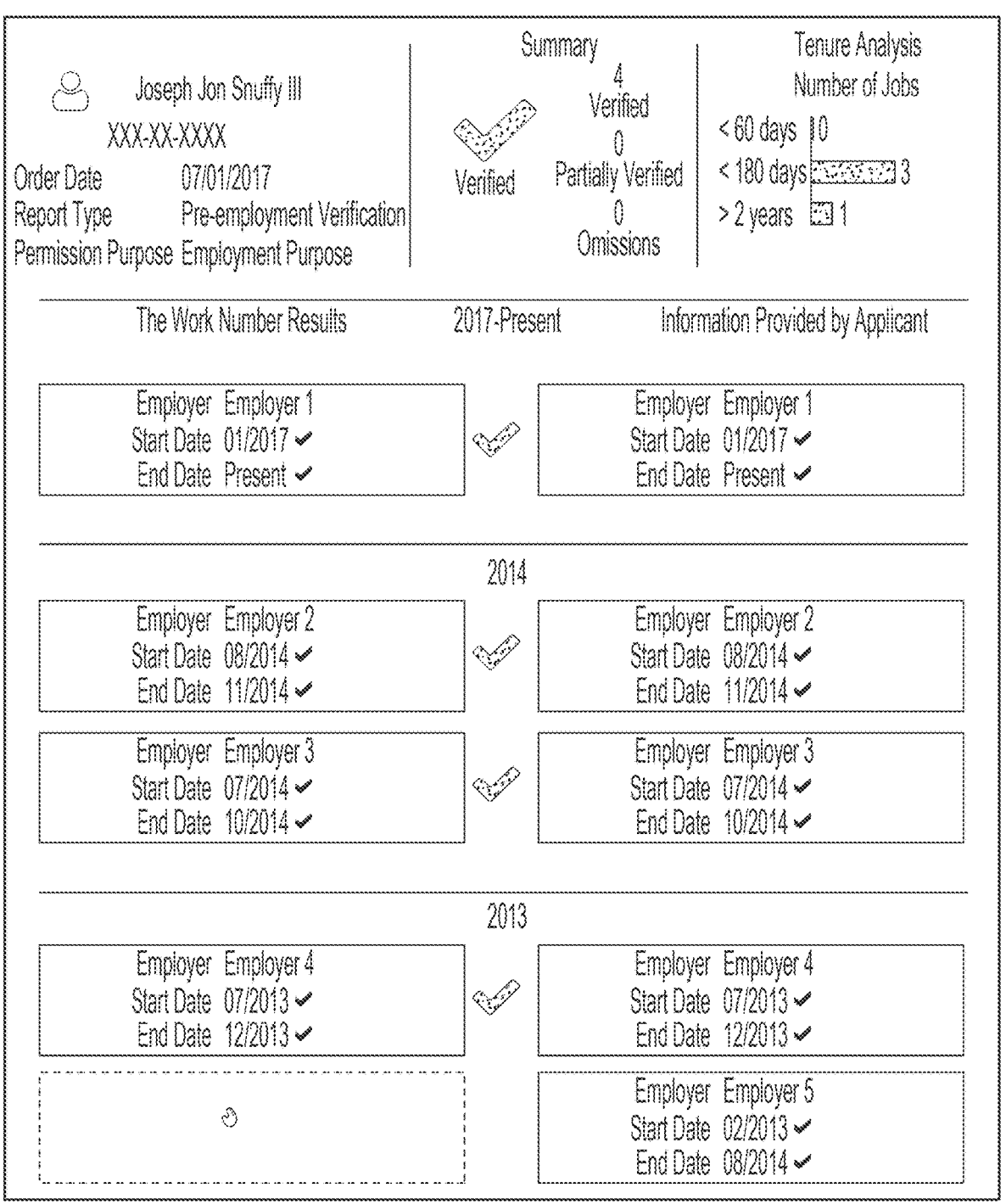
FIG. 4 depicts another example of an interface that can be generated using a dynamic access-control data structure generated by the process in FIG. 2, according to certain aspects described within the present disclosure.

FIG. 4 depicts another example of an interface that can be generated using a dynamic access-control data structure. For instance, the interface depicted in FIG. 4 can include an intelligent summary at the top of the page. In this example, the intelligent summary includes a visual indicator of a risk (e.g., a checkmark having a red color or a pattern indicating high risk, a yellow color or a pattern indicating moderate or low risk, or a green color or a pattern indicating a low or non-existent risk). The intelligent summary can also include a summary of any inconsistencies detected at block 208 of the process 200. In this example, the summary of any inconsistencies indicates matches in job history data, where matches are based on matching start and end dates. The summary can include a number of matches (e.g., matching start and end dates), a number of partial matches (e.g., a match between start dates only, a match between end dates only, matches in the months of start or end dates coupled with discrepancies in days or years of the start or end dates, etc.), a number of omissions (e.g., a role being absent from the access request data structure or the role history data), and a number of unverifiable role identifications.

The intelligent summary can also include a summary of one or more role-occupancy assessments performed at block 210 of the process 200. For instance, in FIG. 4, the interface includes a "tenure analysis" section that includes one or more bar graphs identifying a number of jobs held by the target entity for less than 60 days, less than 180 days, and greater than two years.

In each of FIGS. 3 and 4, the interface includes a timeline view of different role data. A first timeline is generated for a first set of roles identified by the role history data of a target entity from the identity repository 122. A second timeline is generated for a second set of roles identified by the access data structure for a target entity. Visual indicators positioned between the two timelines can indicate whether an inconsistency exists with respect to a particular role. For instance, a given row of the two timelines can correspond to a time period (e.g., a year or some portion thereof) and can include data for a role held by the target entity during a certain period. If the role is identified in both the role history data and the access data structure, a color or pattern of a visual indicator near each set of role data (e.g., a vertical line segment next to each set of role data in FIG. 3, a checkmark between role data of the two timelines in FIG. 4) can indicate the presence or absence of an inconsistency. For instance, a blue color (or the dotted pattern in FIG. 4) can indicate a complete match (e.g., matches for start date, end date, job title), and an orange color (or the diagonal-lines pattern in FIG. 4) can indicate a partial match (e.g., matches for some, but not all, of start date, end date, job title). Additionally or alternatively, if a given row of the two timelines includes data for a role in one of the timelines and lacks any data in the other timeline, the absence of the data in one of the timelines can indicate an omission or an unverifiable credential. For instance, a blank spot in the timeline for the access data structure (e.g., the column labeled "information provided by applicant") can indicate an omission of the role from the access request data structure. Alternatively, a blank spot in the timeline for the role history data (e.g., the column labeled "The Work Number Results") can indicate the presence of a false or unverifiable identification of the role in the access request data structure.

Example of Computing System for Access-Verification Process

Figure 5:
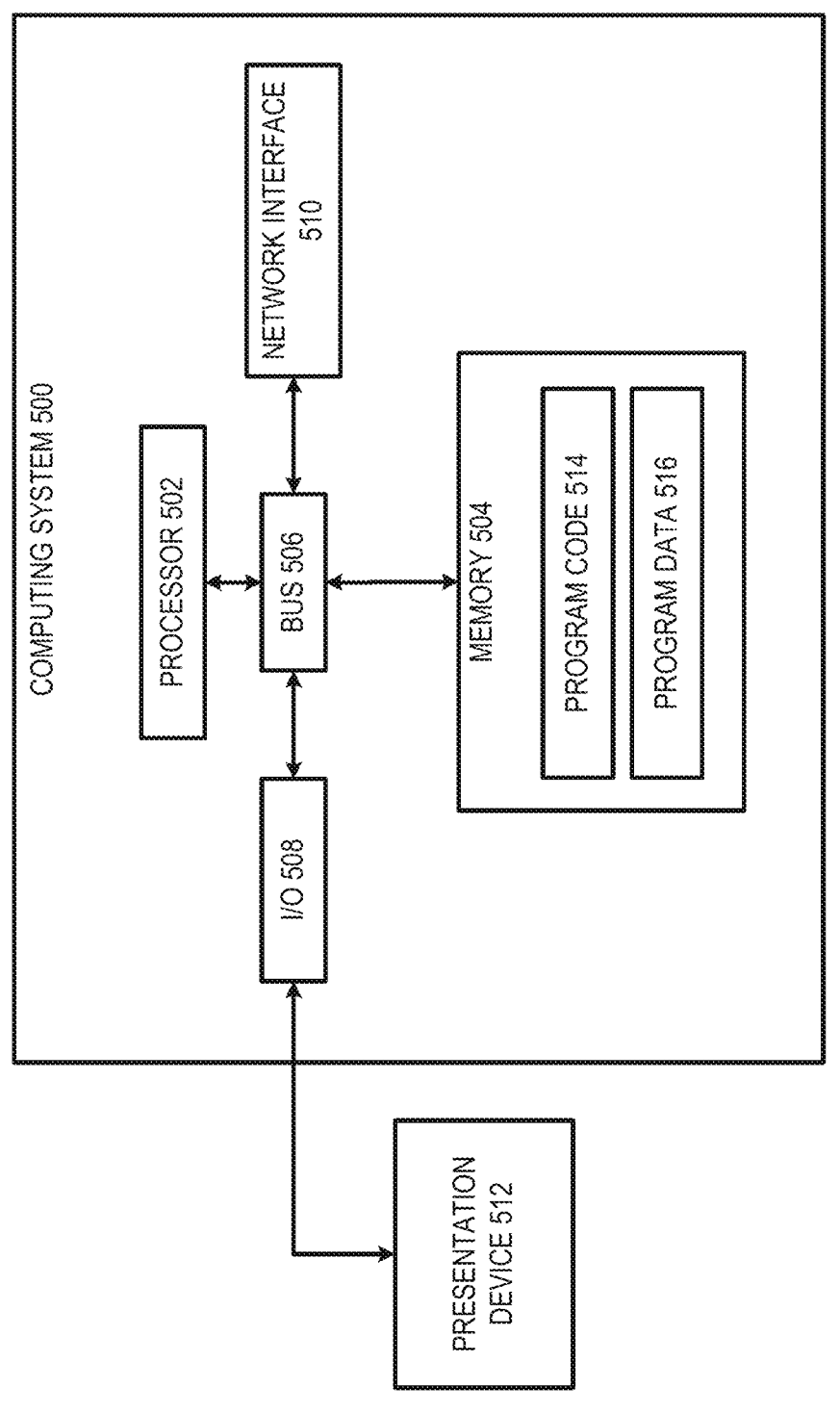
FIG. 5 depicts an example of a computing system suitable for implementing aspects of the techniques and technologies presented herein.

Any suitable computing system or group of computing systems can be used to perform the operations for third-party access verification support described herein. For example, FIG. 5 is a block diagram depicting an example of a computing system 500. The computing system 500 can be used to implement one or more servers of an access-control server 118. The computing system 500 can include various devices for communicating with other devices in the access-control computing system 100, as described with respect to FIG. 1. The computing system 500 can include various devices for performing one or more transformation operations described above with respect to FIGS. 1-4. In additional or alternative aspects, computing systems with similar devices and different program code can be used to implement one or more of a contributor computing system 102, a client computing system 104, or a user device 106.

The computing system 500 can include a processor 502 that is communicatively coupled to a memory 504. Examples of a processor 502 include a microprocessor, an application-specific integrated circuit, a field-programmable gate array, or any other suitable processing device. The processor 502 can include any number of processing devices, including one. The processor 502 can include or communicate with a memory 504. The memory 504 stores program code that, when executed by the processor 502, causes the processor to perform the operations described in this disclosure.

The memory 504 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code.

The processor 502 executes computer-executable program code 514 stored in the memory 504, accesses program data 516 stored in the memory 504, or both. The program code 514 can include, for example, the role-data evaluation engine 120, one or more detection rules 121, or other program code that can perform one or more operations described herein with respect to FIGS. 1-4. The program data 516 can include, for example, the identity repository 122, the role history data 124, one or more access request data structures, one or more dynamic access-control data structures, or data that can be used in one or more operations described herein with respect to FIGS. 1-4.

Program code 514 may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. The program code may include processor-specific program code generated by a compiler or an interpreter from code written in any suitable computer-programming language. Examples of suitable programming language include Hadoop, C, C++, C #, Visual Basic, Java, Python, Perl, JavaScript, ActionScript, etc.

The computing system 500 may also include a number of external or internal devices such as input or output devices. For example, the computing system 500 is shown with an input/output interface 508 that can receive input from input devices or provide output to output devices. A bus 506 can also be included in the computing system 500. The bus 506 can communicatively couple one or more components of the computing system 500.

The computing system 500 can execute program code that includes the role-data evaluation engine 120. The program code for the role-data evaluation engine 120 may be resident in any suitable computer-readable medium and may be executed on any suitable processing device. For example, as depicted in FIG. 5, the program code for the role-data evaluation engine 120 can reside in the memory 504 at the computing system 500. Executing the role-data evaluation engine 120 can configure the processor 502 to perform the operations described herein.

In some aspects, the computing system 500 can include one or more output devices. One example of an output device is the network interface device 510 depicted in FIG. 5. A network interface device 510 can include any device or group of devices suitable for establishing a wired or wireless data connection to one or more data networks described herein. Non-limiting examples of the network interface device 510 include an Ethernet network adapter, a modem, etc.

Another example of an output device is the presentation device 512 depicted in FIG. 5. A presentation device 512 can include any device or group of devices suitable for providing visual, auditory, or other suitable sensory output. Non-limiting examples of the presentation device 512 include a touchscreen, a monitor, a speaker, a separate mobile computing device, etc. In some aspects, the presentation device 512 can include a remote client-computing device that communicates with the computing system 500 using one or more data networks described herein. In other aspects, the presentation device 512 can be omitted.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A system comprising:

a contributor external-facing device configured for communicating with an access-control server system and for obtaining, over a data network, role history data for entities;

a client external-facing device configured for:

receiving, from a client computing system, a query requesting that an access-verification process be applied to an access request data structure having a set of credential elements for a target entity, and transmitting a control signal having a dynamic access-control data structure to a device in the client computing system; and the access-control server system configured for:

retrieving, from an identity repository storing role history data, a subset of the role history data for the target entity, correlating values between the set of credential elements of the access request data structure and attributes from the subset of the role history data, detecting, based on the correlation, an inconsistency between a first set of roles for the target entity identified in the access request data structure and a second set of roles for the target entity identified in the subset of the role history data, computing a role-occupancy assessment based on durations of the target entity in roles that are identified in the second set of roles, generating the dynamic access-control data structure comprising (i) inconsistency data describing the inconsistency and (ii) the role-occupancy assessment, wherein the control signal is configured for causing the device of the client computing system to present an interface having one or more of: the role-occupancy assessment with one or more visual indicators of a security assessment associated with the durations of the target entity in the roles, or a timeline view that visually depicts the inconsistency data.

2. The system of claim 1, wherein the client external-facing device is further configured for preventing the client computing system from accessing additional role history data from the identity repository that does not match the query.

3. The system of claim 1, wherein detecting the inconsistency comprises identifying a difference between a first role identification in the first set of roles and a second role identification in the second set of roles.

4. The system of claim 1, wherein detecting the inconsistency comprises identifying a difference between a first role duration in the first set of roles and a second role duration in the second set of roles.

5. The system of claim 1, wherein detecting the inconsistency comprises identifying at least one of (a) a role in the first set of roles that lacks a corresponding role in the second set of roles or (b) a role in the second set of roles that lacks a corresponding role in the first set of roles.

6. The system of claim 1, wherein computing the role-occupancy assessment comprises determining whether at least one of the role durations exceeds a threshold duration.

7. The system of claim 1, wherein computing the role-occupancy assessment comprises:

identifying a first level of authority associated with a first identified role;

determining whether a first role duration for the first identified role exceeds a first threshold duration specific to the first level of authority;

identifying a second level of authority that is associated with a second identified role and that is different from the first level of authority; and determining whether a second role duration for the second identified role exceeds a second threshold duration specific to the second level of authority.

8. The system of claim 1, wherein computing the role-occupancy assessment comprises:

determining, for an identified role, an age of the target entity during an occupancy of the identified role by the target entity; and excluding the identified role from the role-occupancy assessment based on the age being less than a threshold age.

9. A non-transitory computer-readable medium having program code stored thereon, the program code executing by processing hardware to perform operations comprising:

obtaining, via communications with contributor computing systems over a data network, role history data for entities;

receiving, from a client computing system, a query requesting that an access-verification process be applied to an access request data structure having a set of credential elements for a target entity;

preventing the client computing system from accessing additional role history data from an identity repository that does not match the query;

retrieving, from the identity repository, a subset of the role history data for the target entity;

correlating values between the set of credential elements of the access request data structure and attributes from the subset of the role history data;

detecting, based on the correlation, an inconsistency between a first set of roles for the entity identified in the access request data structure and a second set of roles for the entity identified in the subset of the role history data;

computing a role-occupancy assessment based on durations of the target entity in roles that are identified in the second set of roles; and transmitting a control signal to the client computing system, wherein the control signal is configured for causing the client computing system to present an interface having one or more of: the role-occupancy assessment with one or more visual indicators of a security assessment associated with the durations of the target entity in the roles, or a timeline view that visually depicts inconsistency data corresponding to the inconsistency.

10. The non-transitory computer-readable medium of claim 9, wherein detecting the inconsistency comprises:

identifying a difference between a first role identification in the first set of roles and a second role identification in the second set of roles;

identifying a difference between a first role duration in the first set of roles and a second role duration in the second set of roles; and identifying at least one of (a) a role in the first set of roles that lacks a corresponding role in the second set of roles or (b) a role in the second set of roles that lacks a corresponding role in the first set of roles.

11. The non-transitory computer-readable medium of claim 9, wherein computing the role-occupancy assessment comprises determining whether at least one of the role durations exceeds a threshold duration.

12. The non-transitory computer-readable medium of claim 9, wherein computing the role-occupancy assessment further comprises:

identifying a first level of authority associated with a first identified role;

determining whether a first role duration for the first identified role exceeds a first threshold duration specific to the first level of authority;

identifying a second level of authority that is associated with a second identified role and that is different from the first level of authority; and determining whether a second role duration for the second identified role exceeds a second threshold duration specific to the second level of authority.

13. The non-transitory computer-readable medium of claim 9, wherein computing the role-occupancy assessment comprises:

determining, for an identified role, an age of the target entity during an occupancy of the identified role by the target entity; and excluding the identified role from the role-occupancy assessment based on the age being less than a threshold age.

14. A method that includes performing, by processing hardware, operations comprising:

obtaining, via communications with contributor computing systems over a data network, role history data for entities;

receiving, from a client computing system, a query requesting that an access-verification process be applied to an access request data structure having a set of credential elements for a target entity;

retrieving, from an identity repository, a subset of the role history data for the target entity;

detecting an inconsistency between a first set of roles for the entity identified in the access request data structure and a second set of roles for the entity identified in the subset of the role history data;

computing a role-occupancy assessment based on durations of the target entity in roles that are identified in the second set of roles;

generating a dynamic access-control data structure comprising (i) inconsistency data describing the inconsistency and (ii) the role-occupancy assessment; and transmitting a control signal having the dynamic access-control data structure to a device in the client computing system, wherein the control signal is configured for causing the device of the client computing system to present an interface having one or more of: the role-occupancy assessment with visual indicators of a security assessment associated with the durations of the target entity in the roles, or a timeline view that visually depicts the inconsistency data.

15. The method of claim 14, wherein a client external-facing device is further configured for preventing the client computing system from accessing additional role history data from the identity repository that does not match the query.

16. The method of claim 14, wherein detecting the inconsistency comprises identifying a difference between a first role identification in the first set of roles and a second role identification in the second set of roles.

17. The method of claim 14, wherein detecting the inconsistency comprises identifying a difference between a first role duration in the first set of roles and a second role duration in the second set of roles.

18. The method of claim 14, wherein detecting the inconsistency comprises identifying at least one of (a) a role in the first set of roles that lacks a corresponding role in the second set of roles or (b) a role in the second set of roles that lacks a corresponding role in the first set of roles.

19. The method of claim 14, wherein computing the role-occupancy assessment comprises determining whether at least one of the role durations exceeds a threshold duration.

20. The method of claim 14, wherein computing the role-occupancy assessment comprises:

identifying a first level of authority associated with a first identified role;

determining whether a first role duration for the first identified role exceeds a first threshold duration specific to the first level of authority;

identifying a second level of authority that is associated with a second identified role and that is different from the first level of authority; and determining whether a second role duration for the second identified role exceeds a second threshold duration specific to the second level of authority.

* * * * *